Aug. 2, 1949.  E. M. GRIFFIN  2,477,691
ELECTRIC CURRENT GENERATING PLANT
Filed March 8, 1948  2 Sheets-Sheet 1
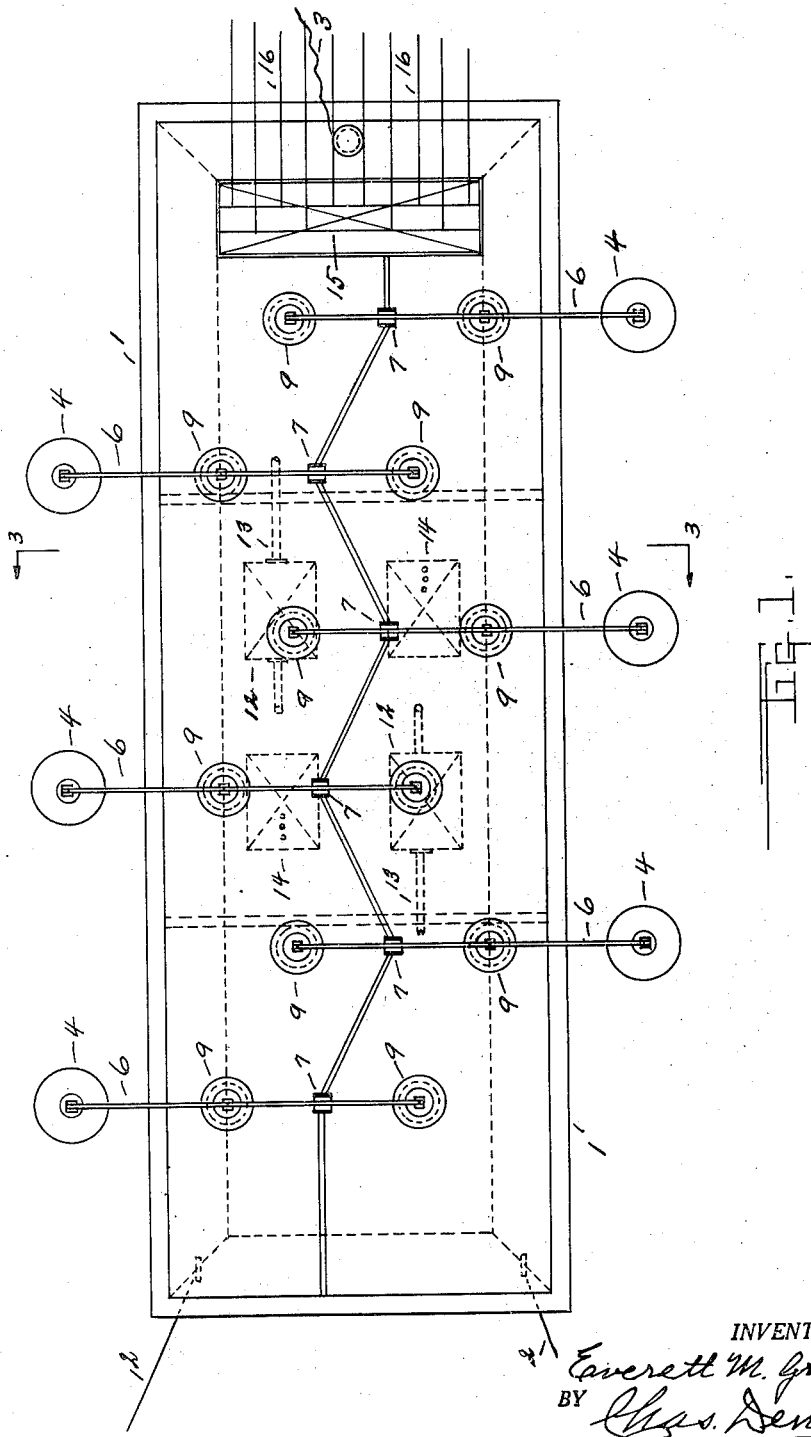
INVENTOR.
Everett M. Griffin
BY Chas. Denegre
Attorney.

Aug. 2, 1949.　　　　E. M. GRIFFIN　　　　2,477,691
ELECTRIC CURRENT GENERATING PLANT
Filed March 8, 1948　　　　　　　　　　　　　2 Sheets-Sheet 2
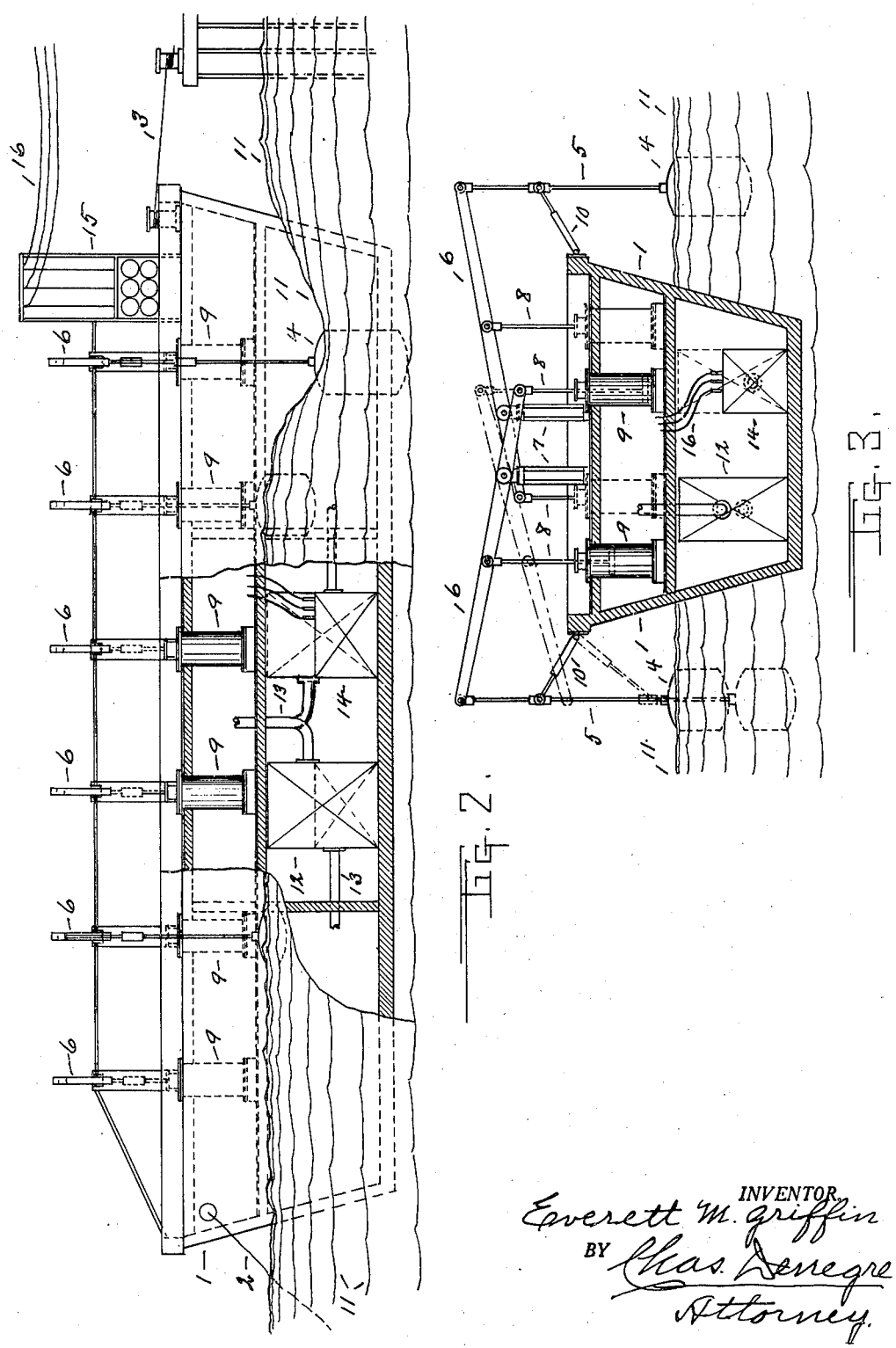

Patented Aug. 2, 1949

2,477,691

UNITED STATES PATENT OFFICE 2,477,691

ELECTRIC CURRENT GENERATING PLANT

Everett M. Griffin, Homewood, Ala.

Application March 8, 1948, Serial No. 13,703

1 Claim. (Cl. 230—67)

This invention relates to a combination electric current generating plant. It has for its main object to provide such a plant by combining natural power with well known mechanical devices in a manner to take advantage of the natural power and transform it into finally generating electric current or power. The invention resides in the arrangement and combination of the elements and parts to produce a final result consisting in progressively using the rise and fall of water waves to elevate and lower floats or pontoons coacting with arms and levers to operate air compressors to store air under pressure for use in driving turbine or similar type electric generators to thus produce electric current; the assembly of the mechanical parts being contained and supported in a barge or similar structure. The drawings and specification are along the line of general structure, it being understood that many variations may be made as to details in sizes and connections of all the manufactured units comprising the plant.

Other objects and advantages will appear from the drawings and description.

By referring to the drawings generally it will be observed that Fig. 1 is a plan view of the barge, the air compressors, the floats or pontoons, the operating levers, part of anchoring and holding cables, and the tanks and generators below the decks indicated in broken lines; Fig. 2 is a side elevational view showing the barge partly broken away, the water waves, the air compressors, the floats, the operating levers, the air tanks and electric generators, the electric wires leading from the barge, parts of anchoring cables, the shore contact cable, and the adjacent shore connection; and Fig. 3 is a cross sectional view on line 3—3 of Fig. 2.

Similar reference numerals refer to similar parts throughout the several views.

Referring to the drawings in detail it will be seen that the combined power plant comprises a large barge 1 held in position by cables 2 attached to anchors (not shown) and the shore line 3. Along each side of the barge a plurality of floats or pontoons 4 are supported on depending rods 5 connected to levers 6 with fulcrums 7. Connected to the levers are piston rods 8 of the air compressors 9. The float rods are provided with cylinder and piston type braces 10 for holding and guiding the rods as they are moved up and down by the water waves 11. Erected within the barge below the decks are large air tanks 12 in connection by suitable pipes 13 with the air compressors. The pipes may be connected in series or individually with the compressors. The electric generators 14 adapted to be operated by compressed air are also installed below the decks. Regular types of electrical connections 15 and wires 16 are used to carry the generated electric current from the power plant to the shore for final use.

From the foregoing it will appear that the fundamental principle of the combination is to take advantage of the tremendous power of the waves of large bodies of water. There is practically no limit to the size and number of the manufactured units that may be employed. In a locality many average size plants may be preferable over a very few large installations. Such matters would be worked out by engineers familiar with the units used. In places where waves rolled high large plants would be used. In a low wave locality a smaller plant would be used.

While I have shown and described the preferred embodiment of my invention, I do not wish to limit same to the exact and precise details of structure, but reserve the right to make all modifications and changes so long as they remain within the spirit and scope of the following claim.

Having described my invention I claim:

In a compressed air plant comprising; a large barge floating in water, a plurality of air compressors in pairs mounted upon and in the decks of said barge, a lever mounted upon a fulcrum between each pair of said air compressors, the piston rods of the air compressors attached to said lever and positioned one on each side of each fulcrum, each lever having an integral end extending beyond the side of the barge, a depending rod on each end of said extensions, a float attached on the lower end of each depending rod, each depending rod having a cylinder and piston type guide attached to it and the side of the barge; a plurality of air storage tanks mounted within said barge, pipe connections leading from said compressors to said air storage tanks adapted to convey compressed air from said compressors to said storage tanks.

EVERETT M. GRIFFIN.

REFERENCES CITED

The following references are of record in the file of this patent:

UNITED STATES PATENTS

| Number | Name | Date |
|---|---|---|
| 571,511 | Clark | Nov. 17, 1896 |
| 816,934 | Newell | Apr. 3, 1906 |
| 855,258 | Neal | May 28, 1907 |
| 888,721 | Milbury | May 26, 1908 |
| 901,117 | McManus | Oct. 13, 1908 |
| 1,244,309 | Fix | Oct. 23, 1917 |